United States Patent [19]

Paul, Jr.

[11] 4,372,334

[45] Feb. 8, 1983

[54] OVERPRESSURE RELIEF CONTROL SYSTEM

[75] Inventor: Herman L. Paul, Jr., Lebanon, Pa.

[73] Assignee: Continental Disc Corporation, Kansas City, Mo.

[21] Appl. No.: 303,346

[22] Filed: Sep. 18, 1981

Related U.S. Application Data

[63] Continuation-in-part of Ser. No. 264,355, May 18, 1981, and Ser. No. 264,276, May 18, 1981.

[51] Int. Cl.³ .............................................. F17D 1/00
[52] U.S. Cl. ................................. 137/12; 137/68 R; 137/557; 137/625.16; 137/119; 137/876; 137/613
[58] Field of Search ............... 137/12, 68 R, 119, 557, 137/454.2, 454.6, 515.7, 625.13, 625.15, 625.16, 876, 887, 625.47, 613, 625.12

[56] References Cited

U.S. PATENT DOCUMENTS

| | | | |
|---|---|---|---|
| 3,952,759 | 4/1976 | Ottenstein | 137/12 |
| 4,215,746 | 8/1980 | Hallden | 137/557 X |
| 4,263,929 | 4/1981 | Keanney | 137/557 X |

Primary Examiner—Harold W. Weakley
Attorney, Agent, or Firm—Litman, Day and McMahon

[57] ABSTRACT

A control system for an overpressure relief arrangement includes a valve providing selective communication between a pressure passage connected to a pressure vessel and a pair of relief passages, each relief passage having an overpressure relief device therein; sensors for monitoring the pressure in the pressure passage, the status of the relief devices, and the position of the valve; an actuator to move the valve; and a computer to make decisions concerning the placement of the valve based upon the data derived from the sensors. The valve normally provides communication between the pressure passage and first relief passage preferably having a rupture disc therein. Upon rupture of the disc, the system pressure is monitored until it is safe to switch to the second relief passage without overpressuring the relief device therein. If the pressure should increase to the overpressure level within a selected period, the valve is switched back to the first relief passage to exhaust the pressure to a safe level; and the valve is switched back to the second relief passage when sufficient pressurized fluid has been exhausted.

14 Claims, 6 Drawing Figures

OVERPRESSURE RELIEF CONTROL SYSTEM

CROSS-REFERENCE TO RELATED APPLICATIONS

The present application is a continuation-in-part of United States Applications for patent Ser. No. 264,355, VALVE ASSEMBLY, filed May 18, 1981, and Ser. No. 264,276, REPLACEABLE RUPTURE DISC CARTRIDGE ARRANGEMENT, filed May 18, 1981.

FIELD OF THE INVENTION

The present invention relates to control systems for valves and, more particularly, a control system for a valve in a multiple passage overpressure relief system.

BACKGROUND OF THE INVENTION

In the chemical industry and other industries, overpressure relief systems are the requirement of almost every pressurized line, tank, or other vessel. The most common types of relief devices are rupture discs and relief valves. Rupture discs present an inherent problem in that once ruptured, the disc must be replaced in order for the relief device to seal the vent line associated therewith. If the material in the line or tank is toxic or otherwise hazardous, the line or tank must often be completely emptied and purged before the ruptured disc may be replaced. In addition, if the material in the line or tank is volatile in nature, a substantial amount of the material may escape into the vent system before the ruptured disc can be replaced.

Relief valves overcome the problem associated with ruptured discs somewhat in that valves are biased to close and thereby occlude the vent line after the pressure in the system returns to an acceptable level. However, relief valves are relatively expensive compared to rupture discs. In addition, relief valves require a great deal of maintenance in order to insure their workability and, therefore, must frequently be removed from the process and tested. Such removal again requires that volatile or hazardous materials be removed from the process tanks and lines protected by the relief valves before the valve can be removed. It is, therefore, desirable that multiple relief devices be provided for a common vent such that the vent may normally be in flow communication with the first relief device and, should the first device need maintenance and/or replacement, be able to switch to a second relief device while isolating the first device from the system. In switching from one relief device to another, it is extremely important to insure that the process under pressure is at all times protected by at least one of the relief devices. After the first disc has ruptured, it is desirable for the valve to communicate the pressurized fluid in the line or tank to the unruptured relief device as soon as the pressure within the process returns to a non-overpressure state and stabilizes. In this manner, the loss of material from the process through the ruptured relief device beyond that which is necessary to return the process to a non-overpressure state is minimized.

SUMMARY OF THE INVENTION

The above stated objectives are accomplished by the use of such a valve in a multiple relief device system with an automated control system which is responsive to the rupture of a first disc to automatically actuate the valve to communicate the process with an unruptured relief device. The control mechanism can be manually overridden or may operate to partially swing the valve to the unruptured relief device so as to continue to vent some of the material and thereby relieve the overpressure condition but not vent more material than is necessary to reduce the pressure to an acceptable level.

OBJECTS OF THE INVENTION

The principal objects of the present invention are: to provide a system for controlling a valve providing communication between a pressurized line and a pair of relief passages having overpressure relief devices therein; to provide such a system which includes the monitoring of the pressure in the pressurized line, the status of the relief devices, and the position of the valve for determining whether to switch the valve; to provide such a system, the functions of which are monitored and controlled by a computer; to provide such a system wherein the valve is normally placed to provide flow communication with a first relief passage having a rupture disc blocking flow therethrough; to provide such a system which switches the system to a second relief passage upon the rupture of the disc in the first relief passage; to provide such a system which allows excess pressure to exhaust before switching to the second relief passage to avoid rupturing a second disc therein; to provide such a system which is adaptable for throttling communication with the first relief passage such that after the first disc has ruptured and the valve has switched to the second relief passage, if the pressure rises to the overpressure level, the valve switches to variable communication with the first relief passage to exhaust only the amount of pressurized fluid necessary to maintain the pressure below the overpressure level; to provide such a system which is adaptable for monitoring and controlling overpressure conditions in a large number of pressure systems within a plant; to provide such a system wherein the automatic functions may be overridden, for example, to inspect or replace the relief devices without emptying or possibly purging the pressurized system; and to provide such a system which is economical to manufacture, positive and durable in operation, and which is particularly well adapted for its intended purpose.

Other objects and advantages of the present invention will become apparent from the following description taken in connection with the accompanying drawings wherein are set forth, by way of illustration and example, certain embodiments of this invention.

The drawings constitute a part of the specification, include an exemplary embodiment of the present invention, and illustrate various objects and features thereof.

DESCRIPTION OF THE PREFERRED EMBODIMENTS

Figure 1:
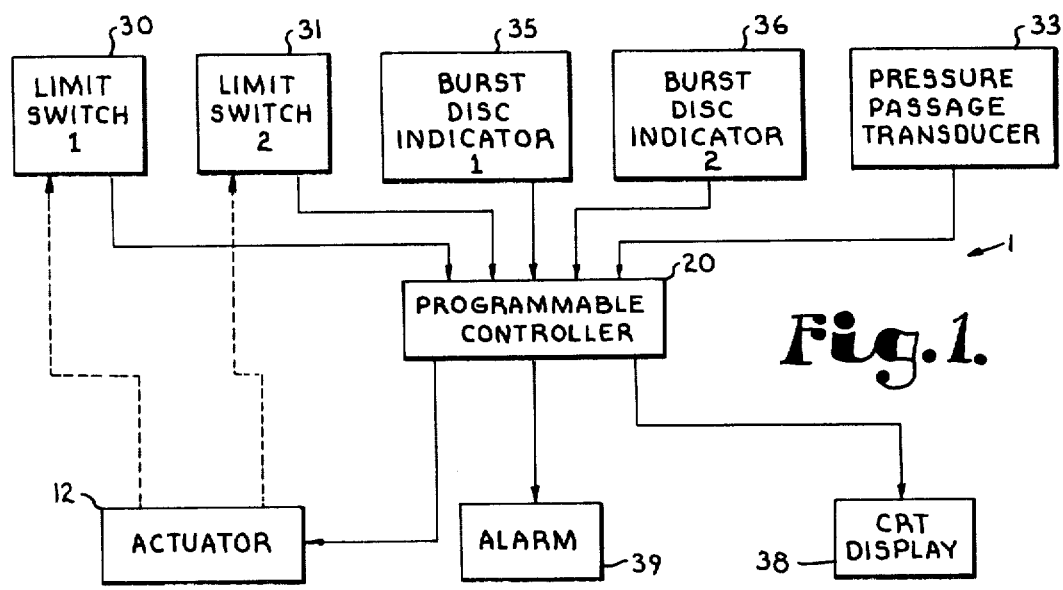
FIG. 1 is a block diagram of a preferred embodiment of the control system according to the present invention.
Figure 2:
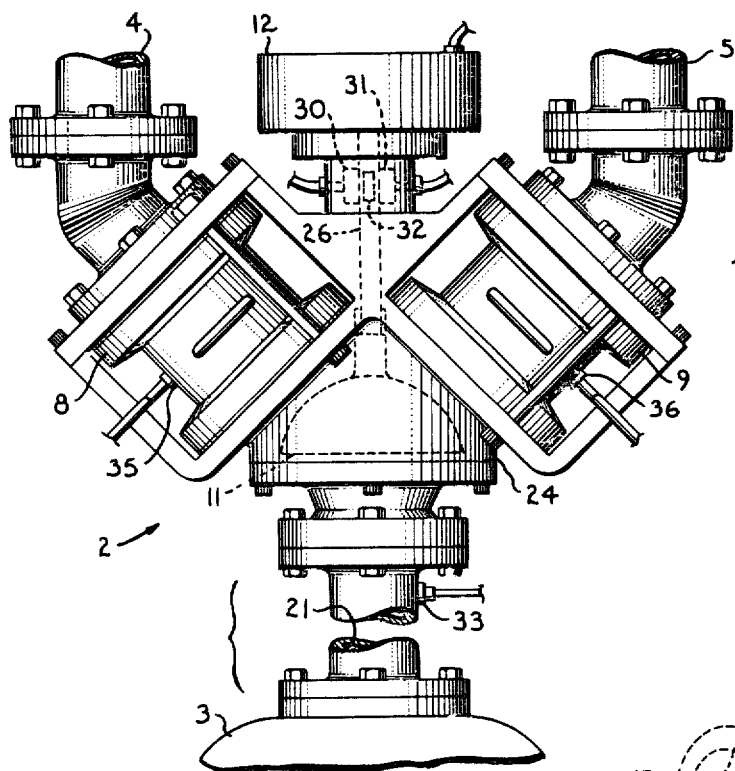
FIG. 2 is an elevational view of a valve assembly with which the control system of the present invention is used.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a control system for controlling the operation of a valve assembly 2 providing communication between a pressure vessel 3 and a pair of relief vents 4 and 5. The relief vents 4 and 5 have respective overpressure relief devices 8 and 9 positioned therein to block flow therethrough until the pressure within the assembly 2 exceeds the overpressure rating of the relief devices 8 and 9. The valve assembly 2 includes a flow directing member or valve 11 rotatable by a motor or actuator 12 to align ports 14 and 15 of the valve with relief passages 17 and 18 respectively of the relief vents 4 and 5. Preferably, at least one of the overpressure relief devices, for example device 8, is a rupture disc. The control system 1 includes a programmable controller or computer 20 which is responsive to selected parameters of the valve assembly 2 so as to place the flow directing member 11 in a position to provide communication between a pressure passage 21 of the valve assembly 2 and one of the relief passages 17 or 18.

A valve assembly with which the control system 1 is particularly suitable is disclosed in my copending application for U.S. Patent entitled VALVE ASSEMBLY, Serial No. 264,355, filed May 18, 1981, and which is incorporated herein by reference.

The valve assembly 2 includes a housing 24 having the valve member 11 positioned therein and having the pressure passage 21 and relief passages 17 and 18 interconnected therein. The valve member 11 is positioned such that a spherical surface 25 thereof sealingly engages a surface within the housing 24 to prevent flow through the relief passages 17 and 18 except when one of the ports 14 or 15 opens thereinto. The valve member 11 is connected by a stem or shaft 26 to the actuator 12 for rotation of the valve member 11 to change the position thereof. The actuator 12 may be an electric, hydraulic, pneumatic, or similar motor.

As stated above, the relief device 8 is preferably a rupture disc. The relief device 9 may be any type of overpressure relief device such as an overpressure relief valve, a rupture disc or a vent to a surge tank. In the illustrated valve assembly 2, each of the relief devices 8 and 9 is a rupture disc. Any type of conventional rupture disc arrangement may be employed for the rupture discs 8 and 9. As illustrated, each of the rupture discs 8 and 9 is embodied as a replaceable rupture disc cartridge arrangement. As background, reference may be made to my copending application for U.S. Patent entitled REPLACEABLE RUPTURE DISC CARTRIDGE ARRANGEMENT, Ser. No. 264,276, filed May 18, 1981.

Figure 3:
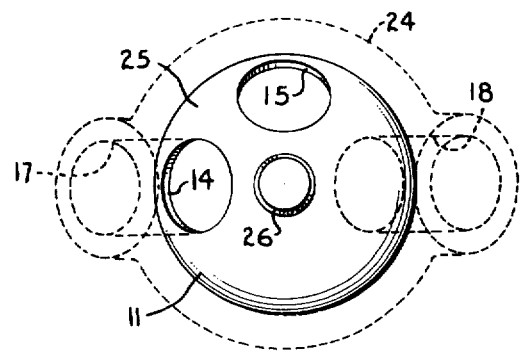
FIG. 3 is an enlarged diagramatic plan view of a first position of a flow directing member of the valve with which the control system is used with a valve housing shown in phantom.
Figure 4:
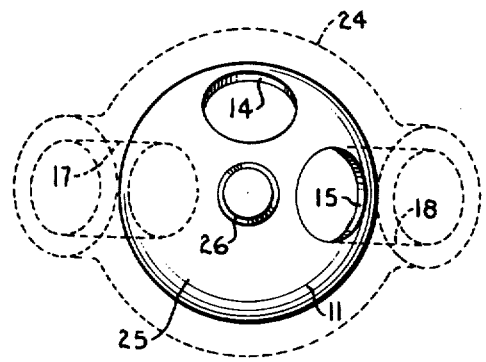
FIG. 4 is a view similar to FIG. 3 and illustrates a second position of the flow directing member.

The actuator 12, which controls the position of the valve member 11, is in turn controlled by the programmable controller 20 which monitors selected conditions or parameters of the valve assembly 2. In the illustrated control system 1, the conditions which are monitored by the programmable controller or computer 20 include the pressure within the pressure passage 21, the position of the valve member 11, and the status of the overpressure relief devices 8 and 9. In the control system 1 illustrated in FIG. 1, the position of the valve member 11 is sensed by means of a first limit switch 30 and a second limit switch 31 which are positioned for actuation by means such as a tripping tab 32 on the stem 26 of the valve member 11. The first limit switch 30 is positioned for actuation when the valve member 11 is placed in a first position (see FIG. 3) wherein the port 14 provides full flow communication between the pressure passage 21 and the first relief passage 17. In a similar manner, the second limit switch 31 is positioned for actuation when the valve member 11 is placed in a second position (see FIG. 4) wherein the port 15 provides full flow communication between the pressure passage 21 and the second relief passage 18. The pressure in the pressure passage 21 may be monitored by means of a pressure transducer 33 positioned therein. Alternatively, the pressure transducer 33 may be positioned to monitor the pressure in the pressure vessel 3. In a static situation, such as where there is no flow through the pressure passage 21, the pressure in the pressure vessel 3, pressure passage 21, or within the valve assembly 2 are all substantially equal. Under dynamic conditions, when there is flow through the valve assembly, the pressure acting on one of the relief devices 8 or 9 is different from the pressure within the pressure passage 21 or pressure vessel 3 by an amount which may be measured and taken into consideration.

The status or integrity of the rupture discs 8 and 9 may be monitored by means of burst disc indicators respectively 35 and 36. The burst disc indicators 35 and 36 may be any type of conventional arrangements for determining whether a rupture disc has ruptured. The majority of known burst disc indicators are of the contact type wherein portions of the ruptured disc cause contact between conductive portions of the indicator upon bursting. A different type of conductive burst indicator is disclosed in a pending application for U.S. Patent entitled RUPTURE DISC ALARM SYSTEM, Ser. No. 115,261, filed Jan. 25, 1980 and assigned to the same assignee of the present application.. A burst disc indicator which functions by capacitive principles is disclosed in a pending application for U.S. Patent entitled CAPACITIVE PRESSURE RELIEF RUPTURE DISC MONITOR, Ser. No. 230,662, filed Feb. 2, 1981 and assigned to the same assignee as the present invention. When an overpressure relief valve is employed instead of the second rupture disc 9, the status of the relief valve may be monitored by means of a pneumatic or electrical signaling device incorporated into the relief valve or by means of a pressure transducer or switch installed downstream of the relief valve within the second relief vent 5. The integrity of either of the rupture discs 8 or 9 may similarly be sensed by such pressure transducers installed downstream thereof such as within the relief vent 4 or 5.

The programmable controller 20 may be any type of digital computer having the capacity for processing all of the monitored parameters and control and display functions in real-time. In the illustrated system 1, the limit switches 30 and 31 and burst disc indicators 35 and 36 are digital measurements. However, the functions of the pressure transducer 33 and, in some cases, the actuator 12 are analog in nature. Therefore, the controller 20 would have to include analog-to-digital and digital-to-analog converters to interface the analog inputs and outputs thereto. Computers considered for use in the control system 1 include a model Apple II computer from Apple Computers, Inc. in conjunction with a model No. MHP-X023 A/D and D/A converter from Mountain Computer, Inc. of Santa Cruz, California or a model No. EPC7101 Programmable Sequencer from Encoder Products Company.

Preferably, the computer 20 is provided with the usual terminal features including a keyboard (not shown) and a display unit 38 for providing a visual indication of the position of the valve member 11, the pressure within the pressure passage 21, and the status of each of the relief devices 8 and 9, such as a cathode ray tube (CRT) display. Further, it is desirable to have an alarm 39 connected to the computer 20 to give audible indication of the rupture or operation of one of the overpressure relief devices 8 or 9.

In most installations, the computer 20 would have a plurality of the valve assemblies, such as assembly 2, interfaced therewith for control thereby. The limits to the number of valve assemblies 2 which could be controlled by a single computer 20 would depend upon the capacity of the particular computer 20 to process the data from the systems connected thereto in real-time. If more valve assemblies 2 were desired to be controlled from a single control point, a plurality of the computers 20 having the valve assemblies 2 connected thereto could be interfaced with a master computer (not shown).

In operation, the overpressure rating of the overpressure relief devices 8 and 9 is entered into the computer 20. The valve 11 is normally placed in a first position (as in FIG. 3) wherein the port 14 provides full flow communication between the pressure passage 21 and the first relief passage 17 having the rupture disc 8 therein. The first position of the valve 11 is sensed by the first limit switch 30. When the pressure within the pressure vessel 3 exceeds the overpressure rating of the rupture disc 8, the disc 8 fails thereby exhausting excess pressure through the relief passage 17. The rupture of the disc 8 is sensed by the first burst disc indicator 35 positioned on the disc 8 or in the vent 4 which provides a signal to the computer 20 which responds by activating the alarm 39. At the same time, information identifying the particular disc 8 and, preferably, the location thereof, is displayed on the CRT 38. The computer 20 monitors the pressure within the passage 21 by means of the pressure transducer 33 positioned therein. When the pressure has decreased to a selected first fraction of the overpressure rating of the disc 9 and if the disc 9 is still intact, the computer 20 controls the actuator 12 to rotate the valve 11 to the second position (see FIG. 4) wherein the port 15 provides flow communication between the pressure passage 21 and the second relief passage 18 having the disc 9 therein. At this point, a timer (not shown) within the computer 20 is initiated. The selected first fraction of the overpressure rating of the disc 9 to which the computer allows the pressure to exhaust is, in the preferred embodiment, eighty percent of the pressure required to rupture the disc 9.

The computer 20 continues through the timer to monitor the pressure for a selected time interval in order to allow the pressure within the system to stabilize. If the pressure increases to a selected second fraction of the overpressure rating of the disc 9 within the selected time interval, the computer 20 controls the actuator 12 to return the valve 11 to the first position in order to exhaust the excess pressure through the previously ruptured disc 8. The selected second fraction of the overpressure rating of the disc 9 is, for example, ninety percent. The valve 11 remains in the first position until the pressure within the passage 21 again decreases to the first fraction, or eighty percent of the second disc overpressure rating, at which time the valve 11 is returned to the second position. In this manner, the second disc 9 is prevented from being ruptured; and, further, the loss of fluid through the opening relief passage 17 is minimized. The pressure vessel 3 may then be returned to normal operation with overpressure protection provided by the second disc 9. In the meantime, the ruptured disc 8 may be removed and replaced so that the pressure vessel 3 is again provided with a primary and a backup overpressure protection device. While the rupture disc 8 is being replaced, the valve 11 may be manually locked in the second position by a switch or the like adapted to disengage power from the actuator 12.

Figure 5:
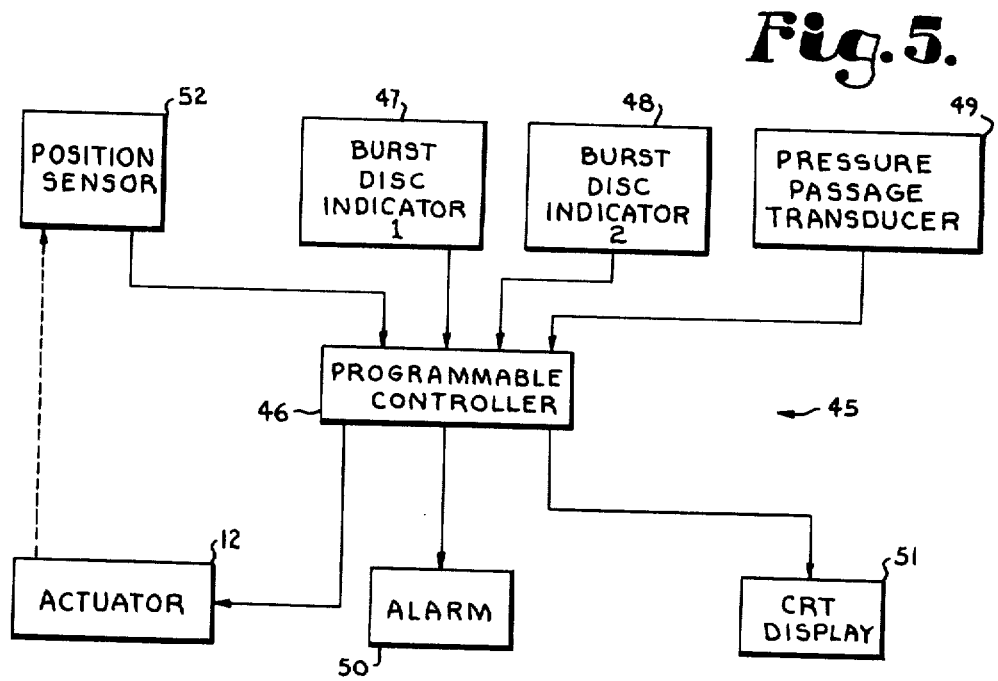
FIG. 5 is a block diagram of a modification of the control system according to the present invention.

FIG. 5 illustrates a modified embodiment according to the present invention. The modified control system 45 includes a programmable controller or computer 46 having first and second burst disc indicators respectively 47 and 48 and a pressure passage transducer 49 connected as inputs thereto. The computer 46 has an alarm 50 connected thereto and a CRT display 51 for displaying information relating to the control of the valve assembly 2. These functions of the control system 45 are substantially similar to corresponding functions associated with the preferred control system 1. The principal difference between the preferred control system 1 and the modified system 45 is that the computer 46 is operative to continuously monitor the position of the valve 11 by means of a position sensor 52, in contrast to the limit switches 30 and 31 of the system 1.

The position sensor 52 may comprise any type of device for continuously monitoring the position of the valve 11. One type of continuous position sensor 52 which may be associated with the actuator 12 provides a pneumatic signal wherein the pressure thereof is an indication of the position of the valve 11. Other types of sensors 52 which may be employed include hydraulic or electrical sensing and signaling devices. One type of electrical position sensor which may be employed includes an encoding wheel (not shown) wherein a plurality of apertures on a periphery thereof are operative to establish and interupt a light beam directed to a photocell. A digital counter within the computer 46 is then employed to determine the position of the valve 11. In some cases, particularly with a counting type of electrical position sensor, it is sometimes desirable to employ a stepping motor as the actuator 12.

Figure 6:
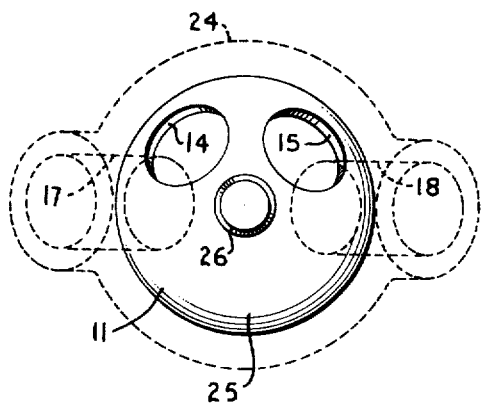
FIG. 6 is a view similar to FIG. 3 and shows the flow directing member in a position to vary communication between the pressure passage and the relief passages of the valve assembly of FIG. 2.

The operation of the modified system 45 is somewhat different from the operation of the preferred control system 1. When the first rupture disc 8 ruptures, the computer 46 allows the pressure to exhaust to, for example, eighty percent of the overpressure rating of the second relief device 9 before controlling the actuator 12 to rotate the valve 11 to the second position. With the valve 11 in the second position (FIG. 4), if the pressure within the pressure passage increases to, for example, ninety percent of the overpressure rating of the second relief device 9, the computer 46 controls the actuator 12 to rotate the valve 11 to partially align the port 14 with the first relief passage 17. Then, in cooperation with the pressure passage transducer 49, the valve 11 is throttled to maintain the pressure within the pressure passage 21 below, for example, ninety percent of the overpressure rating of the second relief device 9. Referring to FIG. 6, as the pressure within the pressure passage 21 increases, the degree of alignment between the port 14 and the relief passage 17 is increased to thereby maintain the pressure within the passage 21 at a safe level. Similarly, as the pressure within the passage 21 decreases, the degree of alignment between the port 14 and the relief passage 17 is decreased in order to minimize the loss of product or pressurized fluid within the system. As can be seen in FIG. 6, as the degree of alignment between the port and relief passage 17 is decreased, the degree of alignment between the port 15 and relief passage 18 is increased whereby the pressure vessel 3 is protected from occurrences such as sudden increases in pressure. When the pressure within the passage 21 has decreased, for example, below eighty percent of the overpressure rating of the second relief device 9 and stabilized, the valve 11 is rotated into the second position so that the first rupture disc may be replaced. In all other respects, the modified control system 46 is substantially similar to the preferred control system 1.

While certain forms of the present invention been have described and illustrated, it is not to be limited thereto except insofar as such limitations are included in the following claims.

What is claimed and desired to secure by Letters Patent is:

1. A method of relieving an overpressure condition within a pressurized system having a pressure passage to vent pressurized fluid therefrom comprising the steps of:
   (a) providing at least two relief passages for flowing a pressurized fluid to a safe discharge location;
   (b) interconnecting said relief passages with said pressure passage by means of a valve normally in a first position to provide full flow communication between said pressure passage and a first of said relief passages, said valve including motor means to move said valve between said first position and a second position providing full flow communication between said pressure passage and a second relief passage;
   (c) providing each relief passage with an overpressure relief device having a respective overpressure rating, said relief device in the first relief passage being a rupture disc;
   (d) sensing the integrity of said rupture disc;
   (e) sensing the pressure within said pressure passage; and
   (f) upon sensing the rupture of said rupture disc and upon the pressure in said pressure passage decreasing to a selected first fraction of the overpressure rating of the relief device in said second relief passage, controlling said motor means to place said valve in said second position.

2. In a method of controlling a valve in an overpressure relief arrangement, said valve being normally placed in a first position by motor means to provide full flow communication between a pressure passage and a first of at least two relief passages, each of said relief passages having an overpressure relief device therein, each relief device having a respective overpressure rating, the relief device in at least the first relief passage being a rupture disc, said motor means being operable to place said valve to provide flow communication between said pressure passage and the other of said relief passages, the improvement comprising the steps of:
   (a) sensing the integrity of said rupture disc;
   (b) sensing the pressure within said pressure passage; and
   (c) upon sensing the rupture of said rupture disc and upon the pressure in said pressure passage decreasing to a selected first fraction of an overpressure rating of the relief device in a second relief passage, controlling said motor means to place said valve in a second position providing full flow communication between said pressure passage and said second relief passage.

3. A method as set forth in claim 1 or 2 including the steps of:
   (a) upon said valve reaching said second position and the pressure in said pressure passage increasing to a selected second fraction of said overpressure rating of the second relief device within a selected time interval, controlling said motor means to place said valve in said first position; and
   (b) upon sensing that the pressure in said pressure passage has decreased to said first fraction within said selected time interval, controlling said motor means to place said valve in said second position.

4. A method as set forth in claim 1 or 2 wherein said rupture disc is a first rupture disc and said relief device in said second relief passage is a second rupture disc, and including the steps of:
   (a) sensing the integrity of said second rupture disc;
   (b) upon said valve reaching said second position and the pressure in said pressure passage exceeding a selected second fraction of said overpressure rating of the second relief device within a selected time interval, controlling said motor means to place said valve in said first position; and
   (c) upon sensing that the pressure in said pressure passage has decreased to said first fraction within said selected time interval and that said second rupture disc has not ruptured, controlling said motor means to place said valve in said second position.

5. A method as set forth in claim 1 or 2 including the steps of:
   (a) upon said valve reaching said second position and upon the pressure in said pressure passage exceeding a selected second fraction of said overpressure rating of the second relief device, controlling said motor means to place said valve in a position to provide partial flow communication between said pressure passage and said first relief passage;
   (b) varying the position of said valve to maintain the pressure in said pressure passage below said second fraction and, at the same time, to minimize the loss of fluid through said first relief passage; and
   (c) upon sensing that the pressure in said pressure passage has decreased to said first fraction, controlling said motor means to place said valve in said second position.

6. A method as set forth in claim 1 or 2 wherein said rupture disc is a first rupture disc and said relief device in said second relief passage is a second rupture disc, and including the steps of:
   (a) upon said valve reaching said second position and upon the pressure in said pressure passage exceeding a selected second fraction of said overpressure rating of the second relief device controlling said motor means to place said valve in a position to provide partial flow communication between said pressure passage and said first relief passage;

(b) varying the position of said valve to maintain the pressure in said pressure passage below said second fraction and, at the same time, to minimize the loss of fluid through said first relief passage; and (c) upon sensing that the pressure in said pressure passage has decreased to said first fraction controlling said motor means to place said valve in said second position.

7. In combination:

(a) a valve assembly comprising a valve housing, a valve, a pressure passage communicating with said valve and two relief passages communicating with said valve, said assembly including motor means to position said valve to provide selective flow communication between said pressure passage and said relief passages, said valve normally being placed in a first position to provide full flow communication between said pressure passage and a first relief passage, each of said relief passages having an overpressure relief device associated therewith, a first relief device associated with said first relief passage being a rupture disc; and (b) a control system to control the position of said valve, said control system comprising:

(1) transducer means providing a pressure signal indicative of the pressure within said pressure passage;

(2) relief indicator means cooperating with said first relief device to generate a relief signal upon the operation of said first relief device to relieve an overpressure condition within said first relief passage;

(3) position sensor means operative to provide a position signal indicative of the position of said valve; and (4) controller circuit means having said motor means, said transducer means, said relief indicator means, and said position sensor means operatively connected thereto and responding to said relief signal from said relief indicator means indicating that the rupture disc associated therewith has ruptured by placing said valve in a second position providing full flow communication between said pressure passage and a second relief passage.

8. The combination as set forth in claim 7 including:

(a) a second relief device associated with said second relief passage, said second relief device having an overpressure rating associated therewith; and (b) upon the rupture of said rupture disc, said controller responding to indication by said pressure signal that the pressure within said pressure passage has exhausted to a selected first fraction of said overpressure rating by placing said valve in said second position.

9. The combination as set forth in claim 8 wherein said controller circuit means responds to said pressure signal indicating that the pressure within said pressure passage has increased to a selected second fraction of said overpressure rating by returning said valve to said first position.

10. The combination as set forth in claim 8 wherein said controller circuit means responds to said pressure signal indicating that the pressure within said pressure passage has increased to a selected second fraction of said overpressure rating of the relief device associated with said second relief passage by placing said valve in a position providing partial flow communication between said pressure passage and said first relief passage, the degree of communication therebetween varying in proportion to the pressure in said pressure passage to thereby maintain said pressure below said second fraction.

11. The combination as set forth in claim 8 wherein said second relief device is a rupture disc.

12. The combination as set forth in claim 8 wherein said position sensor means includes:

(a) a first limit switch engaged by tripping means on said valve upon being placed in said first position; and (b) a second limit switch engaged by tripping means on said valve upon being placed in said second position.

13. The combination as set forth in claim 8 including alarm means connected to said controller circuit means and operative to give an audible indication of the operation of one of said relief devices.

14. The combination as set forth in claim 8 including display means connected to said controller circuit means and operative to give a visual indication of the position of said valve, the pressure within said pressure passage, and the status of each of said relief devices.

* * * * *